Oct. 25, 1949.  E. L. McCANDLESS ET AL  2,485,979
BENDING SINGLE CRYSTALS OF CORUNDUM AND SPINEL
Filed July 24, 1946

INVENTORS
EDWARD L. McCANDLESS
DONALD M. YENNI
BY
ATTORNEY

Patented Oct. 25, 1949

2,485,979

UNITED STATES PATENT OFFICE 2,485,979

BENDING SINGLE CRYSTALS OF CORUNDUM AND SPINEL

Edward L. McCandless and Donald M. Yenni, Kenmore, N. Y., assignors to The Linde Air Products Company, a corporation of Ohio Application July 24, 1946, Serial No. 685,848

11 Claims. (Cl. 49—84)

This invention relates to bending unicrystalline precious and semiprecious stone bodies composed of corundum or spinel; and, more particularly, to bending thin rods of corundum or spinel. The invention is also concerned with novel bent unicrystalline corundum and spinel bodies as articles of manufacture. This application is a continuation-in-part of our application 536,058 filed May 17, 1944.

A unicrystalline body consists of a single crystal, as distinguished from a multicrystalline body wherein a plurality of crystals are united. Single crystals of corundum and spinel, both natural and synthetic, have long been used for jewel bearings, and as gems. The best known forms of corundum single crystals are the white sapphire, the blue sapphire, and the oriental ruby, all of which are almost pure alumina except for small quantities of coloring material. Magnesia and alumina (with the alumina predominating) are the components of the best known spinel, which may be colorless or may be colored a variety of different colors by the addition of small amounts of metal compounds. Corundum and spinel single crystals have heretofore been formed into various shapes by mechanically cutting, grinding, and polishing them. Such mechanical operations are slow, tedious, and expensive. Furthermore, the number of shapes which may be produced is strictly limited to those having a relatively simple contour.

Among the objects of the present invention are the provision of a novel method for bending into various shapes unicrystalline precious and semiprecious stone bodies composed of material selected from the group consisting of corundum and spinel; and a method for bending corundum rods so as to obtain the optimum yield of usable product with the greatest ease. Other objects are the provision of novel unicrystalline articles of manufacture composed of material selected from the group consisting of corundum and spinel, such as bent rods; and the provision of bent corundum rods of acceptable shape.

The above and other objects, and the novel features of the invention will become apparent from the following description, having reference to the figures of the accompanying drawing, wherein.

Figure 1:
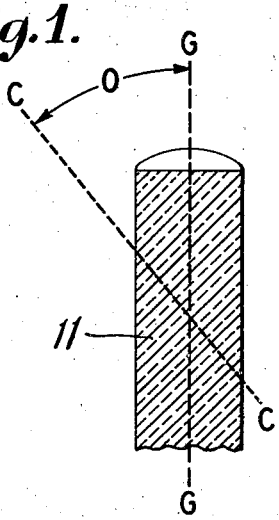
Fig. 1 is an enlarged vertical sectional view of a corundum rod illustrating the meaning of optic orientation.

Unicrystalline synthetic corundum bodies are composed predominantly of alumina, with which sometimes are incorporated small amounts of coloring materials such as chromium oxide for rubies, or iron oxide and titanium dioxide for blue sapphires. Single crystals of corundum are grown synthetically as large diameter boules, and as long substantially cylindrical thin rods, by the method of passing alumina powder through a gas flame and accumulating the alumina in a fused condition on a suitable support which is slowly withdrawn from the flame.

Unicrystalline spinel bodies are formed either naturally or by the above synthetic method by the crystallization of a composition comprising two metal oxides in the ratio of 1 atomic part of metal $R_1$ to 2 atomic parts of metal $R_2$ to 4 atomic parts of oxygen, to form a characteristic cubic crystal ($O_h^7$) having the three equal and mutually perpendicular crystallographic axes of the cubic or isometric system. They include such variations from the above composition as retain the excess oxide of $R_1$ (or $R_2$), or even one or more other oxides, as a solid solution in the spinel with the characteristic cubic structure ($O_h^7$). The most generally used composition is an alumina-magnesia composition containing between 8% and 28% magnesia, balance substantially all alumina. Small quantities of coloring material sometimes are included. Unlike corundum, spinel boules and rods grown synthetically as single crystals do not usually have a cylindrical shape, but are characterized by generally square, rectangular, octagonal, or triangular cross-sections, depending on the orientation of the various crystal faces.

For simplicity, the various features of the invention have been illustrated in the drawing by views of cylindrical corundum rods. Except as otherwise noted hereinafter, however, the views also illustrate the principles of hot forming other corundum bodies and spinel bodies.

In its broader aspects, our novel method of hot bending single crystals of corundum and spinel comprises heating to its softening temperature at least a portion of such a crystal, and bending the heated portion, which is in a state of plasticity, by applying force thereto. The operator can recognize when the moment to apply force has arrived by the color of the crystal (which is a convenient, reasonably accurate, and quick measure of temperature), and by the "feel" of the rod, i. e. its resistance to deformation when exploratory efforts at deformation are made. Deformation is generally accomplished when the crystal is at a readily recognizable white heat, and the higher the temperature the more easily and rapidly can the rod be bent. Actual temperature measurements with an optical pyrometer, with a correction for emissivity, have shown that the temperature necessary for manual bending of such rods varies with the rod diameter, but should be above 2372° F. The maximum temperature is just below the melting point, 3722° F. for corundum and 3875° F. for magnesia-alumina spinel. (The melting point of spinel will vary somewhat with variations in the content of MgO.) Corundum rods of 0.090 inch dameter require a minimum temperature of about 2400° F., and 0.130 inch rods require a minimum temperature of about 2530° F. for manual deformation. These temperatures are considered accurate to ±100° F.

When synthetic corundum and spinel bodies are bent in the manner described briefly above, by applying sufficient heat to raise the surface temperature to the melting point while the interior is retained in the solid condition, the heated portions also are simultaneously glossed by the heat, which seems to melt superficially the crystallites on the surface of the body and cause the melted portions to coalesce into a smooth, scratch-free, and glossy surface. It is also possible to bend the bodies when surface temperatures are so low that no heat glossing occurs but greater force is required and there is a tendency for somewhat more breakage during the bending operation.

According to one theory incipient cracks tend to form in spinel and corundum rods when they are bent at commercially rapid speeds (e. g.—2 seconds for a 360° bend in a 0.1 in. diameter sapphire rod), so that it is advantageous to apply heat to the rod rapidly enough to heat the surface to its melting point and provide a microscopically thin film of molten material on the rod surface to heal such cracks and prevent fracture of the rod. At the lower temperatures where there is no molten surface film, fracture of the rod can be prevented only by bending at such slow speeds that no incipient cracks are formed.

The theory of bending corundum and spinel single crystals is not completely understood. However, it is believed that bending takes place by slippage along certain planes of weakness in the crystal. For example, the basal plane of corundum (the plane normal to the C-axis) is such a plane of weakness and it is probable that part of the distortion occurs by slipping along this basal plane and perhaps along other of the known weakness planes. Slippage is, however, not a complete answer to the problem. An additional phenomenon which may take place is actual distortion of the crystal lattice. In any event, it is certain that the body remains a single crystal after the bending operation.

A more specific description of the methods and products of our invention follows. Although corundum and spinel fundamentally behave in the same manner when hot formed, there will be pointed out below certain differences due to the fact that corundum crystallizes in the hexagonal system and spinel in the cubic or isometric system.

Heating of unicrystalline corundum and spinel bodies for bending is ordinarily accomplished in a gas flame projected from a standard blowpipe. A suitable flame is desirably formed by burning a mixture of oxygen, natural gas, and air, but any other suitable combination of fuel gas and oxygen may be used which gives a flame of sufficient heating intensity to heat the material to its plastic temperature. The flame itself should be broad enough so that at least one inch of the material to be worked can be heated to its plastic temperature, although for small bends in synthetic gem rods of small diameter, a shorter heated section may be desirable. It is advantageous to heat the single crystals in a gas flame of the type described, but it is apparent that they may be heated in other ways, such as by a gas furnace, or an electric arc device, without departing from the principles of the invention.

When bending a unicrystalline non-combustible precious or semi-precious stone body, such as a long, thin rod of material selected from the group consisting of corundum and spinel, one or both ends of the rod are grasped in the hands, or are held in any suitable holding device, while the portion of the rod between the ends is heated to plasticity in the flame. When the plastic or softening temperature has been reached, force is applied to the rod in a direction transversely of its longitudinal axis and continuous relative movement is effected between the ends of the rod in such a way that the distance between the ends is shortened (as measured in free space), thereby forming in one continuous motion a bend having a contour which can be controlled very closely. Usually heating of the rod in the flame is continued during the entire bending operation. It is customary to hold one end of the rod stationary and at the appropriate moment to push or pull on the rod at a position spaced from the stationary end to displace the other end of the rod. Although a simple 360° single loop bend or "pigtail" 13 in a rod 14 has been shown in Fig. 2 of the drawing, both simpler and more complicated bends can be made. For example, very broad bends or hooks can be made, as well as very tight spirals wherein the radius of the bends is almost as small as the diameter of the rod itself.

Figure 5:
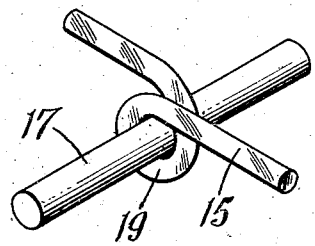
Fig. 5 is a perspective view illustrating a procedure for bending a corundum or spinel rod.

Fig. 5 illustrates a modification of the bending method described above, in which a rod 15 is bent around a mandrel 17 of desired size and shape while continuously heating the rod in a flame, to permit better control of the size and shape of the loop 19. Mandrel 17 may be of carbon, fire clay, refractory oxides, sapphire, or spinel, or other heat resistant material.

During bending the directions and positions of the crystallographic axes and faces of corundum and spinel rods vary in the bend, but the relation of such axes and faces to the longitudinal rod axis remains constant. This relation is called the crystallographic orientation of the rod and is determined at any selected point in a bend by the positions of the axes and faces with respect to the tangent to the longitudinal rod axis at that point. Furthermore, the diameter of a rod is slightly reduced in the bend.

Figure 2:
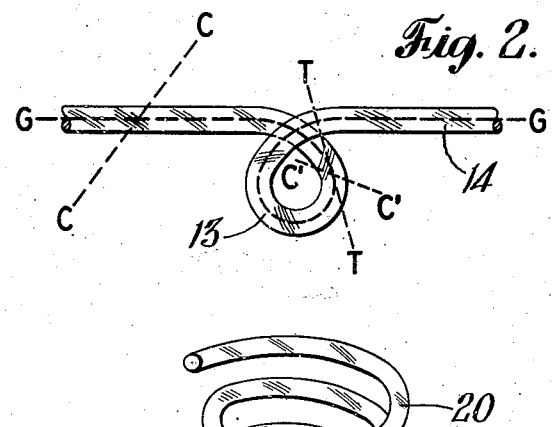
Fig. 2 is an elevational view showing the appearance of a corundum rod bent through 360°.
Figure 3:
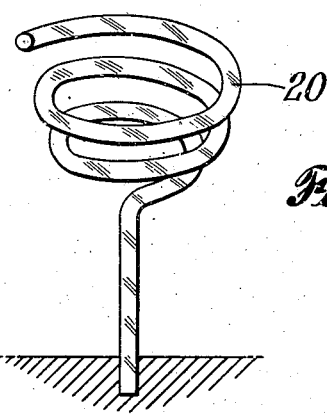
Fig. 3 is an elevational view of a heat-treating support made from coiled corundum rod.
Figure 4:
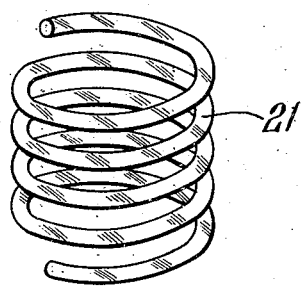
Fig. 4 is an elevational view of a corundum coil spring.

Since both corundum and spinel are materials having great hardness and wear resistance, bent sections, such as the loop 13 shown in Fig. 2, can be used for many purposes where these properties are of importance. For example, rod bent as in Fig. 2, is useful for thread guides in textile mills, and as fishing line guides on fish poles. Corundum and spinel loops are especially useful as guides for rayon thread, which generally is impregnated with abrasive oxides such as titanium dioxide. Spinel and corundum rods also can be bent, with or without a mandrel, into the form of coiled supports 20 (Fig. 3) for supporting articles to be heated in furnaces at high temperature, or coil springs 21 (Fig. 4) which are of value for suspending articles in corrosive media. The two last-mentioned uses depend largely on the refractory and corrosion-resistant properties of corundum and spinel.

Corundum crystallizes in the hexagonal system and has a single principal optic or C-axis, represented on the rod 11 of Fig. 1 by the line C—C, which lies in the direction in which light may be passed through the crystal without being doubly refracted; and three minor axes A—A (not shown), of three-fold rotational symmetry normal to the principal axis, C—C. The orientation of a corundum boule or rod may be completely defined by giving the angles between the longitudinal growth axis G—G and the C- and A-axes, respectively. The term "optic orientation," when used with reference to corundum in this application, refers to the angle O included between the C-axis and the longitudinal or growth axis G—G of the synthetic corundum rod, as shown in Fig. 1. Spinel, however, is optically isotropic and does not have an optic axis.

It has been found that an important relation exists between the optic orientation of corundum bodies and their behavior in hot forming operations. Corundum bodies wherein the optic axis C—C lies between 30 degrees and 75 degrees to the growth axis are most desirable for hot bending operations because, in this range, the hot material is most easily deformed and a good yield of usable product is obtained. Outside of the preferred range there is a marked tendency for the rod to crack or break when bent, and excessive force is required to accomplish bending. Optimum results in bending are obtained by selecting corundum rods having an optic orientation between 40 and 50 degrees. Selection of corundum bodies in the proper optic orientation range is especially important for rod-like sections having diameters of about 0.1 inch or greater.

To illustrate the effect of a high optic orientation on the bending of synthetic unicrystalline corundum rods, ten clear sapphire rods with optic orientation greater than 80 degrees were selected. An attempt then was made to bend all of the selected rods through 360 degrees to form pigtails by heating them in the manner described previously herein and bending them substantially in the plane defined by the optic axis C—C and growth axis G—G. All of the rods broke before a 360 degree bend had been accomplished. In contrast, rods oriented between 30° and 75° almost invariably can be successfully bent through 360°.

The direction of the optic axis C—C in the bent portion of a corundum rod varies continuously during bending with respect to any fixed point in space, but the optic orientation remains substantially constant from one end of the bend to the other because the direction of the optic axis C—C is substantially non-variant with respect to the rod axis at any point under consideration. In the bend the optic orientation is measured by the angle between the C-axis at any selected point and the tangent to the rod axis at that point. Fig. 2 clearly illustrates the direction of the optic axis at two places in a bent rod 14, the line C—C representing its direction in the undeformed portion, and the line C'—C' representing its direction at a point in the bend 13. The angle between C'—C' and the tangent T—T to the rod axis G—G at the point where G—G and C'—C' cross one another is equal to the angle between G—G and C—C in the unbent portion of the rod. The resultant bent products are still single crystals having substantially continuous crystallographic properties throughout, i. e. the change in crystallographic properties through the bent portion is smoothly continuous rather than abrupt or macroscopically stepwise.

Figure 6:
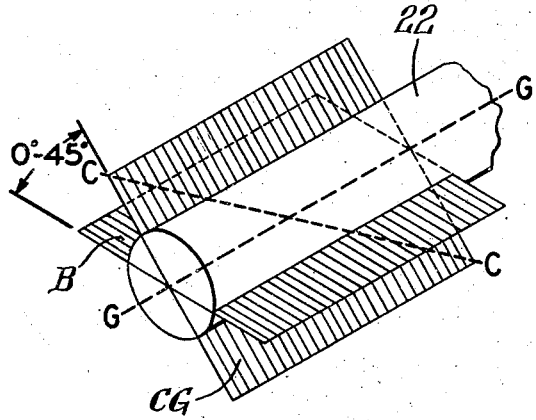
Fig. 6 is an enlarged perspective view illustrating the meaning of terms used hereinafter to describe the preferred procedure for bending a corundum rod.

Although it is possible to bend a unicrystalline corundum rod 22 in any direction, the best yields of bent rods having acceptable shapes are obtained with the least effort when the plane of bending B is between zero and 45 degrees to the plane CG defined by the longitudinal or growth axis G—G, and the intersecting optic axis C—C (see Fig. 6). It is particularly advantageous for the bending plane B substantially to coincide with the plane CG, but commercially acceptable yields and shapes are obtained within the zero to 45° limits of deviation from the CG plane. Although the direction of the optic axis C—C changes during bending, the position of the CG plane remains constant when bending takes place in the CG plane. When the CG plane makes an angle with the bending plane the position of the CG plane varies during bending but the angle remains the same between the bending plane B and the CG plane at any point in the bend (as determined by the C-axis direction and the tangent to the longitudinal axis of the rod at that point). Of course, as a practical matter, bending may not occur wholly in a true plane. For example, in bending a "pigtail" of the type shown in Fig. 2, some deviation from a true plane is necessary to permit one end of the rod to pass under the other.

Bending of a corundum rod in proper relation to the CG plane is facilitated by marking the rod in such a way as to indicate the location of such plane, as by drawing along the outside of the rod parallel to the longitudinal rod axis G—G a pencil line which lies in the CG plane. The CG plane and the plane defined by the axis G—G and the drawn line then coincide, so that proper positioning of the rod for bending can be accomplished. Conventional optical methods can be employed for establishing the location of the CG plane and determining where the pencil mark is to be applied to the rod.

Figure 7:
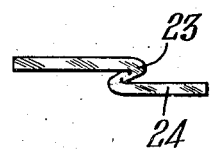
Fig. 7 is an elevational view showing an acceptable corundum "pigtail" which has been bent by the preferred procedure.

As an example of how the relationship between the planes B and CG affects the results in bending, twenty lengths of unicrystalline clear sapphire rod were selected, each having an optic orientation angle O between 40 degrees and 50 degrees. Ten of these rods were then successfully bent through 360° in one continuous motion to form "pigtails" of the type shown in Fig. 2 by heating them between their ends in a flame and bending them in a plane B which made an angle of 22° with the CG plane. All ten of the "pigtails" obtained had desirable shapes, with the adjacent sides of the loops located close together, as in the loop 23 of the "pigtail" 24 shown in Fig. 7.

Figure 8:
Fig. 8 is an elevational view showing, by way of contrast, an unacceptable corundum "pigtail."

The other ten rods were also subjected to a bending test by heating them in a flame in an identical manner and attempting to bend them in a plane B which made an angle of 68° with the CG plane. Four of the rods broke during the bending procedure, but the remaining six were bent through 360°. However, of those six, none had an acceptable shape because each rod tended to twist during bending, with the result that the adjacent sides of the loops were spaced apart a substantial distance, as in the loop 25 of the "pigtail" 27 shown in Fig. 8. Also, more force was required to bend each of those six than was necessary for bending each of the ten described in the preceding paragraph.

Products fashioned from corundum and spinel by the thermal deformation method of the invention have undiminished resistance to chemical corrosion, refractoriness at high temperatures, mechanical strength, and hardness. Furthermore, such products are rapidly and economically produced, and are mechanically strong because the highly flame-glossed smooth and scratch-free surfaces usually existing on the finished products eliminate localized stress concentration or notch effect.

Specific embodiments of the method and products of the invention have been described only by way of illustration. It is apparent that changes in procedure and in the products may be made within the scope of the invention as defined in the appended claims.

What is claimed is:

1. A method comprising heating to plasticity at least a portion of a unicrystalline corundum rod and, by applying force thereto, bending such portion substantially in a plane which makes an angle between zero degrees and 45 degrees with the plane defined by the C-axis and longitudinal axis thereof.

2. A method comprising heating to plasticity at least a portion of a unicrystalline corundum rod and, by apply force thereto, bending such portion substantially in the plane defined by the C-axis and the longitudinal axis thereof.

3. A method comprising selecting a unicrystalline corundum rod wherein the angle between the C-axis and the longitudinal axis of said rod lies between 30 degrees and 75 degrees, heating at least a portion of said rod to plasticity, and by applying force thereto, bending such portion substantially in a plane which makes an angle between zero degrees and 45 degrees with the plane defined by the C-axis and the longitudinal axis thereof.

4. A method comprising selecting a unicrystalline corundum rod, determining the location therein of the plane defined by the C-axis and the longitudinal axis thereof, marking said rod in such a way as to indicate the location of said plane, heating a portion of said rod to plasticity, and bending such portion substantially in a plane which makes an angle between zero and 45 degrees with said first-named plane.

5. A unicrystalline corundum rod having a bend, said bend having substantially constant optic orientation between 30 and 75 degrees from one end thereof to the other.

6. A unicrystalline corundum rod having a bend, said bend having substantially constant optic orientation between 40 and 50 degrees from one end thereof to the other.

7. A unicrystalline corundum rod having a bend lying substantially in a plane which makes an angle between zero and 45 degrees with the plane defined by the C-axis and longitudinal axis of said rod, said C-axis varying in direction in said bend.

8. A unicrystalline corundum rod having a bend, said bend having substantially constant optic orientation between 30 and 75 degrees from one end thereof to the other, said bend lying substantially in a plane which makes an angle between zero and 45 degrees with the plane defined by the C-axis and longitudinal axis of said rod.

9. A method comprising heating a length of a unicrystalline rod of corundum to a temperature above 2372° F., at which said length is plastic, while concurrently heating only a surface portion of said length to its melting point of about 3722° F., and bending such heated length by applying force thereto.

10. A method comprising heating a length of a unicrystalline rod of spinel to a temperature above 2372° F., at which said length is plastic, while concurrently heating only a surface portion of said length to its melting point of about 3875° F., and bending such heated length by applying force thereto.

11. A unicrystalline corundum rod having a bend lying substantially in the plane defined by the C-axis and the longitudinal axis of said rod, said C-axis varying in direction in said bend.

EDWARD L. McCANDLESS.
DONALD M. YENNI.

REFERENCES CITED

The following references are of record in the file of this patent:

UNITED STATES PATENTS

| Number | Name | Date |
|---|---|---|
| 1,264,355 | Wiegand | Apr. 30, 1918 |
| 1,580,199 | Hering | Apr. 13, 1926 |
| 2,021,276 | Weinhart | Nov. 19, 1935 |
| 2,265,070 | Goode | Dec. 2, 1941 |

FOREIGN PATENTS

| Number | Country | Date |
|---|---|---|
| 165,052 | Great Britain | Dec. 28, 1921 |
| 243,251 | Great Britain | Nov. 26, 1925 |
| 396,018 | Great Britain | Oct. 19, 1931 |